(12) United States Patent
Wakebe et al.

(10) Patent No.: US 9,978,133 B2
(45) Date of Patent: May 22, 2018

(54) EJECTION CONTROLLER AND EJECTION CONTROL METHOD FOR INJECTION MOLDING MACHINE

(71) Applicant: FANUC Corporation, Yamanashi (JP)

(72) Inventors: Shuichi Wakebe, Yamanashi (JP); Kousuke Mizumura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 113 days.

(21) Appl. No.: 14/962,477

(22) Filed: Dec. 8, 2015

(65) Prior Publication Data

US 2016/0167266 A1 Jun. 16, 2016

(30) Foreign Application Priority Data

Dec. 12, 2014 (JP) .................................. 2014-252459

(51) Int. Cl.
*G06K 9/00* (2006.01)
*G06T 7/00* (2017.01)
*B29C 45/76* (2006.01)

(52) U.S. Cl.
CPC ........ *G06T 7/0004* (2013.01); *B29C 45/7626* (2013.01); *B29C 2945/7629* (2013.01); *B29C 2945/76418* (2013.01); *B29C 2945/76464* (2013.01); *B29C 2945/76551* (2013.01); *B29C 2945/76896* (2013.01); *B29C 2945/76939* (2013.01)

(58) Field of Classification Search
CPC ........ B29C 45/7626; B29C 2945/7629; B29C 2945/76418; B29C 2945/76464; B29C 2945/76896; B29C 2945/76939; B29C 2945/76551; G06T 7/0004
See application file for complete search history.

(56) References Cited

U.S. PATENT DOCUMENTS

| 5,267,058 | A | * | 11/1993 | Sata | ..................... H04N 1/0057 358/496 |
| 5,523,045 | A | * | 6/1996 | Kudert | ................... B29C 45/16 264/255 |
| 5,928,578 | A | * | 7/1999 | Kachnic | .............. B29C 45/7626 264/334 |

(Continued)

FOREIGN PATENT DOCUMENTS

| JP | 46-37103 B | 11/1971 |
| JP | 60-222220 A | 11/1985 |

(Continued)

OTHER PUBLICATIONS

Office Action in JP Application No. 2014-252459 dated Feb. 7, 2017.

*Primary Examiner* — Mekonen Bekele
(74) *Attorney, Agent, or Firm* — Hauptman Ham, LLP

(57) ABSTRACT

In an ejection controller for an injection molding machine, an image of an ejection process for a molded article is captured, a point in time when the molded article starts to drop from a mold is obtained as a drop start time point, an ejection stop time point is set based on the obtained drop start time point, and an ejection operation of an ejection device is interrupted at the set time point. Thus, the ejection is interrupted in a predetermined position, so that an operator can manually remove the molded article.

4 Claims, 9 Drawing Sheets

(56) References Cited

U.S. PATENT DOCUMENTS

| | | | |
|---|---|---|---|
| 6,062,843 A | 5/2000 | Yamaura | |
| 6,592,354 B2* | 7/2003 | Kachnic | B29C 45/7626 425/137 |
| 8,494,435 B2* | 7/2013 | Nakamichi | G03G 15/50 399/407 |
| 2002/0074676 A1* | 6/2002 | Kachnic | B29C 45/7626 264/40.1 |
| 2003/0065420 A1* | 4/2003 | Kachnic | B29C 45/76 700/204 |
| 2003/0147676 A1* | 8/2003 | Sakata | G03G 15/0808 399/286 |
| 2003/0194460 A1* | 10/2003 | Watanabe | B29C 45/76 425/137 |
| 2005/0033472 A1* | 2/2005 | Kachnic | B29C 45/76 700/200 |
| 2010/0119277 A1* | 5/2010 | Nakamichi | G03G 15/50 399/407 |
| 2010/0273944 A1* | 10/2010 | Kobayashi | B29C 47/0021 525/55 |
| 2014/0156058 A1* | 6/2014 | Kuo | G05B 19/406 700/178 |

FOREIGN PATENT DOCUMENTS

| | | |
|---|---|---|
| JP | 61-195817 A | 8/1986 |
| JP | 62-201220 A | 9/1987 |
| JP | 63-295227 A | 12/1988 |
| JP | 2-208012 A | 8/1990 |
| JP | 10-296818 A | 11/1998 |
| JP | 2009-061786 A | 3/2009 |
| JP | 2009-166323 A | 7/2009 |
| JP | 2009-274356 A | 11/2009 |
| JP | 2016-74130 A | 5/2016 |

* cited by examiner

EJECTION IMAGE STORAGE UNIT — 60

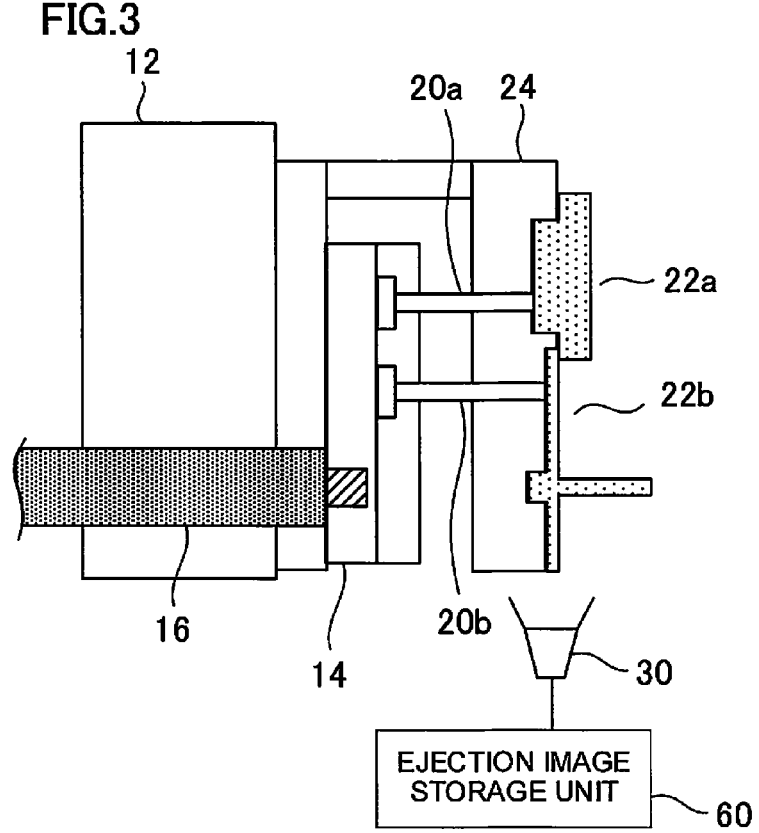
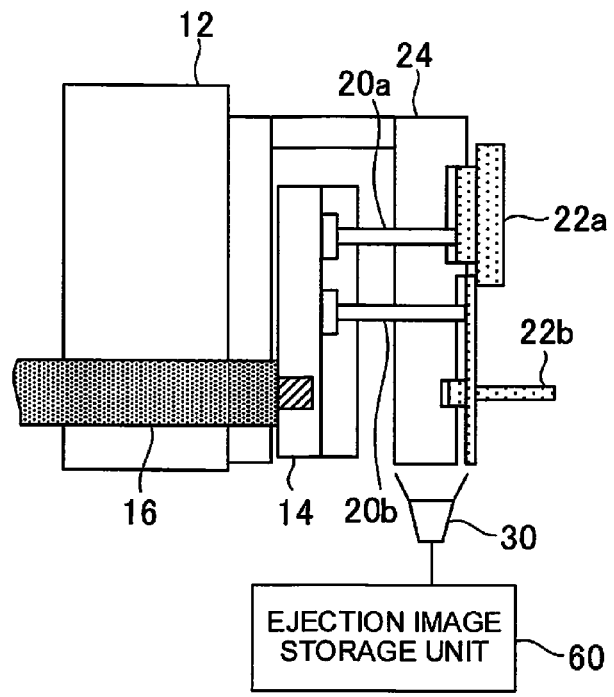

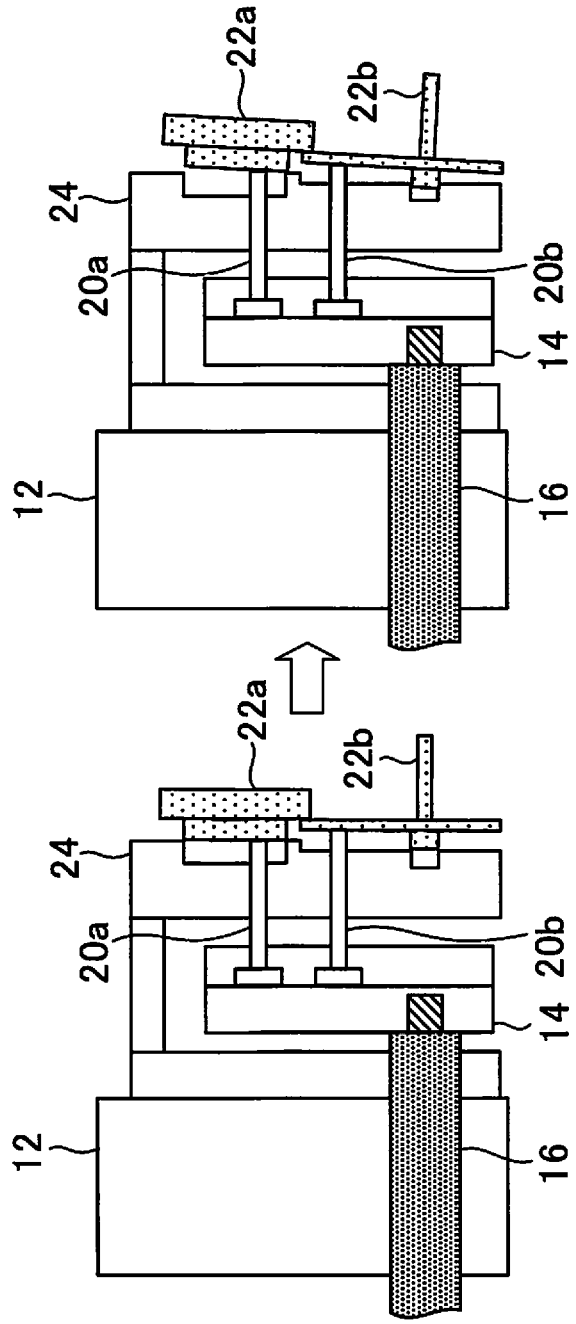

EJECTION CONTROLLER AND EJECTION CONTROL METHOD FOR INJECTION MOLDING MACHINE

RELATED APPLICATIONS

The present application claims priority to Japanese Application Number 2014-252459, filed Dec. 12, 2014, the disclosure of which is hereby incorporated by reference herein in its entirety.

BACKGROUND OF THE INVENTION

Field of the Invention

The present invention relates to an ejection controller and an ejection control method for a molded article ejection device, such as an ejector, for an injection molding machine.

Description of the Related Art

Immediately after the start of a molding operation or in adjusting molding conditions in an injection molding machine, an operator may sometimes open a safety door, which covers the injection molding machine, and then remove molded articles and check them for condition. If a molded article removal machine is used during continuous molding such that the molded articles can be taken out on the opposite side of the injection molding machine to the side on which a control panel is located, moreover, setting for the check of the molded article condition may be changed so that the molded articles can be taken out on the control-panel side of the machine. Further, there is a method in which molded articles are checked for condition after being ejected by an ejector without being taken out by the molded article removal machine.

Japanese Patent Application Laid-Open No. 63-295227 discloses a technique in which a monitoring device in an injection molding machine is used to monitor an ejection operation and a mold opening operation of a movable mold half in a mold opening position. During a plurality of cycles of an injection molding process after initial setting, according to this technique, the injection molding process is repeated to collect determination reference values without regard to the result of the monitoring by the monitoring device, whereby the abnormality of the injection molding process is determined.

Japanese Patent Application Laid-Open No. 2009-61796 discloses a technique in which an image input unit is provided for acquiring images of the mold surfaces of movable and fixed mold halves of an injection molding machine. If a target image acquired by the image input unit is determined to be abnormal, according to this technique, an image of a mold apparatus is transmitted to an operator's terminal device so that the abnormality of molding can easily be ascertained.

In the technique in which the setting for the check of the molded article condition is changed so that the molded articles can be taken out on the control-panel side of the injection molding machine, there is the possibility of the operator standing near the control panel as he/she operates it, so that the molded article removal machine may approach and expose the operator to danger.

In the technique in which the molded articles are checked for condition after being ejected by the ejector, moreover, cavities from which the molded articles are ejected and dropped sometimes cannot be easily identified, especially if the molded articles are large in number.

In the techniques disclosed in Japanese Patent Applications Laid-Open Nos. 63-295227 and 2009-61796, the abnormality of the injection molding process is monitored based on image data captured by image pickup means such as a camera. However, these patent documents disclose neither countermeasures for the detection of abnormality nor a method for preventing abnormality.

SUMMARY OF THE INVENTION

Accordingly, an object of the present invention is to provide an ejection controller and an ejection control method for an injection molding machine, configured so that ejection can be stopped at a predetermined position to enable an operator to manually remove molded articles and a molded article in a desired cavity can be selectively removed without being damaged.

In an ejection controller for an injection molding machine according to the present invention, the injection molding machine comprises an injection unit, a mold, and an ejection device for releasing a molded article of a resin, which is injected from the injection unit into the mold, from the mold after the resin is molded. The ejection controller for the injection molding machine comprises an image pickup unit configured to capture an image of an ejection process for the molded article based on an ejection operation of the ejection device, a molded article ejection image storage unit configured to store the image of the molded article ejection process captured by the image pickup unit, an ejection stop time point setting unit configured to analyze the image stored in the molded article ejection image storage unit to obtain, as a drop start time point, a point in time when the molded article starts to drop from the mold and set an ejection stop time point based on the obtained drop start time point, and an ejection interruption control unit configured to interrupt the ejection operation of the ejection device at the ejection stop time point set by the ejection stop time point setting unit.

The ejection stop time point setting unit may be configured to obtain, as a drop start position, a position of the ejection device in which the molded article starts to drop from the mold, set the obtained drop start position as the drop start time point, obtain, as an ejection stop position, a position retracted from the obtained drop start position by a predetermined distance in a retracting direction of the ejection device, and set the obtained ejection stop position as the ejection stop time point, and moreover, the ejection interruption control unit may be configured to stop the ejection by the ejection device at the obtained ejection stop position.

The ejection stop time point setting unit may be configured to obtain, as a drop start time, an elapsed time since the start of the ejection during which the molded article starts to drop from the mold, set the obtained drop start time as the drop start time point, obtain, as an ejection stop time, a time preceding the obtained drop start time by a predetermined time, and set the obtained ejection stop time as the ejection stop time point, and moreover, the ejection interruption control unit may be configured to stop the ejection by the ejection device when the elapsed time since the start of the ejection reaches the ejection stop time.

The ejection controller for the injection molding machine may further comprise an openable safety door provided at least around the injection molding machine, a safety door closing detection unit configured to detect closing of the safety door, and an ejection restart control unit, and the ejection restart control unit may be configured to restart the ejection by the ejection device when the closing of the safety door is detected by the safety door closing detection unit while the ejection device is being interrupted by the ejection interruption control unit.

The ejection controller for the injection molding machine may further comprise an ejection restart instruction input unit for the ejection device, and the ejection restart control unit may be configured to restart the ejection by the ejection device when an ejection restart instruction signal is input from the ejection restart instruction input unit after the closing of the safety door is detected by the safety door closing detection unit.

The ejection interruption control unit may be configured to also stop a mold opening operation when interrupting the ejection by the ejection device, and the ejection restart control unit may be configured to also restart the mold opening operation when restarting the ejection by the ejection device.

Further, in an ejection control method for an injection molding machine according to the present invention, the injection molding machine is configured to control an ejection device for releasing a molded article of a resin, which is injected from an injection unit into a mold, from the mold after the resin is molded, and the ejection control method comprises a step of capturing an image of an ejection process for the molded article based on an ejection operation of the ejection device, a step of storing the captured image of the molded article ejection process, a step of analyzing the stored image to obtain, as a drop start time point, a point in time when the molded article starts to drop from the mold and setting an ejection stop time point based on the obtained drop start time point, and a step of interrupting the ejection operation of the ejection device at the set ejection stop time point.

The ejection control method for the injection molding machine may further comprise a step of analyzing the stored image and obtaining, as a drop start position for the drop start time point, a position of the ejection device at which the molded article starts to drop from the mold, a step of obtaining, as an ejection stop position for the ejection stop time point, a position retracted from the drop start position by a predetermined distance in a retracting direction of the ejection device, and a step of stopping the ejection by the ejection device at the obtained ejection stop position.

The ejection control method for the injection molding machine may further comprise a step of analyzing the stored image and obtaining, as a drop start time for the drop start time point, an elapsed time since the start of the ejection when the molded article starts to drop from the mold, a step of obtaining, as an ejection stop time for the ejection stop time point, a time preceding the drop start time by a predetermined time, and a step of stopping the ejection by the ejection device when the elapsed time since the start of the ejection reaches the ejection stop time.

According to the present invention constructed as described above, there can be provided an ejection controller and an ejection control method for an injection molding machine, configured so that ejection can be stopped at a predetermined position to enable an operator to manually remove molded articles and a molded article in a desired cavity can be selectively removed without being damaged.

BRIEF DESCRIPTION OF THE DRAWINGS

The above and other objects and features of the present invention will be obvious from the ensuing description of embodiments with reference to the accompanying drawings, in which:

FIG. 3 is a view showing a state of the mold clamping device of the injection molding machine before ejector advance after completion of the mold opening with an enclosing cover unit removed;

FIG. 4 is a view showing a state in which ejector pins of the mold clamping device of the injection molding machine of FIG. 1 are stopped in an ejection interrupting position with the enclosing cover unit removed;

FIGS. 5A and 5B show states in which the ejector pins are further advanced for ejection from the ejection interrupting position shown in FIG. 4, in which FIG. 5A shows a position reached just after molded articles are released from a movable mold half, and FIG. 5B shows a position reached just before the molded articles drop after completion of the mold release;

DETAILED DESCRIPTION OF THE PREFERRED EMBODIMENTS

Figure 1:
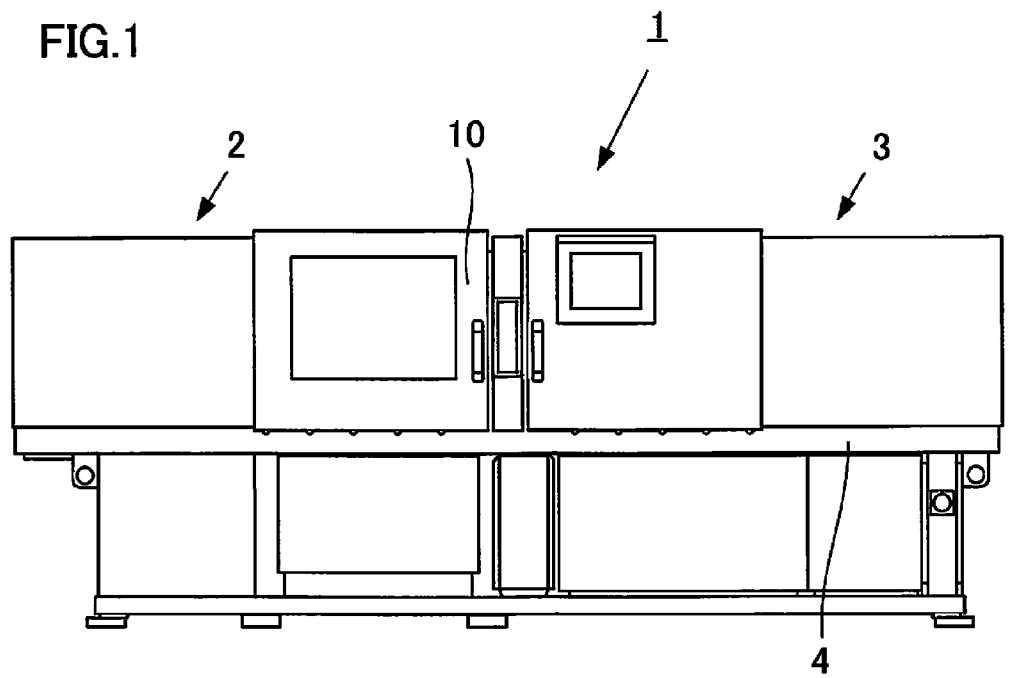
FIG. 1 is a front view showing one form of an injection molding machine incorporated with an ejection controller according to the present invention.

One form of an injection molding machine incorporated with an ejection controller according to the present invention will be described with reference to FIG. 1.

An injection molding machine 1 comprises a mold clamping device 2 and an injection device 3. The mold clamping device 2 opens and closes a mold to generate a clamping force. The injection device 3 is disposed opposite to the mold clamping device 2 and serves to melt a resin and inject it into the mold. The mold clamping device 2 and the injection device 3 are mounted on a machine base 4. Further, both the mold clamping device 2 and the injection device 3 are configured to be enclosed by a cover unit. The mold clamping device 2 is provided with a safety door 10, which is closed while the injection molding machine 1 is operating. In removing a molded article, for example, the operation of the injection molding machine 1 is stopped and the safety door 10 is opened so that the molded article can be taken out of the mold.

Figure 2:
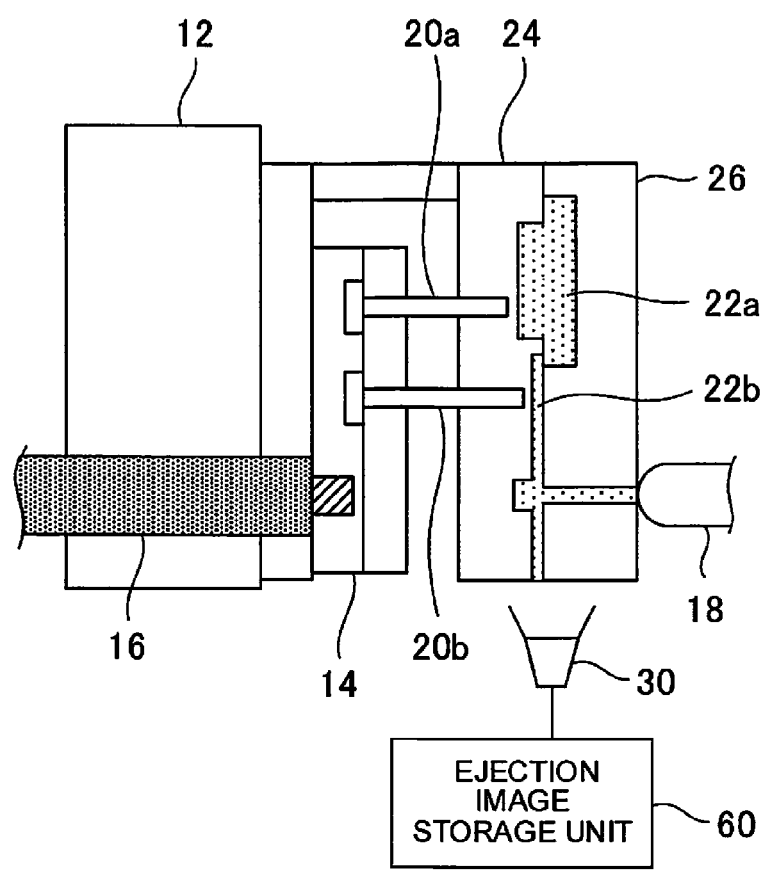
FIG. 2 is a view showing a state of a mold clamping device of the injection molding machine of FIG. 1 before mold opening with an enclosing cover unit removed.

FIGS. 2 to 4 are views showing the configuration of the mold clamping device of the injection molding machine of FIG. 1 with the enclosing cover unit removed.

A movable mold half 24 is connected to a movable platen 12, and a fixed mold half 26 is connected to a fixed platen (not shown) so as to be opposed to the movable mold half 24. The resin is supplied from a nozzle 18 to an area in which the movable and fixed mold halves 24 and 26 face each other. The supplied resin is formed into molded articles 22a and 22b by clamping the movable and fixed mold halves 24 and 26 of the mold clamping device 2.

An ejector 14 is advanced and retracted by the action of an ejector rod 16 of the molding machine. Further, the ejector 14 comprises ejector pins 20a and 20b. As the ejector 14 is advanced, the ejector pins 20a and 20b can contact the molded articles 22a and 22b, thereby ejecting the molded articles. A camera 30 captures images of an ejection process in which the molded articles 22a and 22b are ejected for each predetermined sampling period. The captured images are stored in an ejection image storage unit 60.

FIG. 2 shows a state of the mold clamping unit before mold opening, in which the ejector pins 20a and 20b are in a position off the molded articles 22a and 22b. FIG. 3 shows a state of the mold clamping device before the ejector advance after completion of the mold opening. Further, FIG. 4 shows a state in which the ejector pins 20a and 20b are stopped in an ejection interrupting position.

When the ejector pins 20a and 20b are in the ejection interrupting position, as shown in FIG. 4, the molded articles 22a and 22b are stopped in a position at a predetermined distance from the surface of the movable mold half 24. When the ejector pins 20a and 20b are stopped in this ejection interrupting position, the molded articles 22a and 22b can be manually removed without dropping.

FIGS. 5A and 5B show states in which the ejector pins 20a and 20b are further advanced for ejection from the ejection interrupting position shown in FIG. 4. FIG. 5A shows a position reached just after the molded articles 22a and 22b are released from the movable mold half 24, and FIG. 5B shows a position reached just before the molded articles 22a and 22b drop after completion of the mold release.

Figure 6:
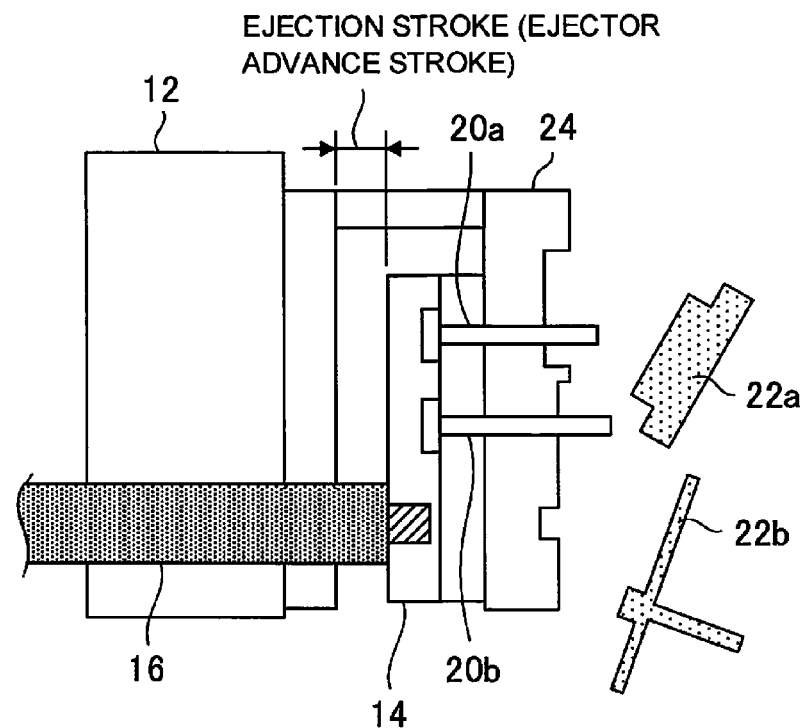
FIG. 6 shows a position in which the ejection is further progressed from the state of FIG. 5B (just before the molded articles drop after the completion of the mold release) so that the ejector pins are advanced by an ejector advance stroke.

FIG. 6 shows a position in which the ejection is further progressed from the state of FIG. 5B (just before the molded articles 22a and 22b drop after the completion of the mold release) so that the ejector pins 20a and 20b are advanced by an ejector advance stroke. In this state, the molded articles 22a and 22b are fully released from the mold and allowed to drop.

The images of the ejection process in which the molded articles 22a and 22b are ejected from the movable mold half 24 by the ejector pins 20a and 20b shown in FIGS. 2 to 6 are captured by the camera 30 for each predetermined sampling period. The captured images are stored in the ejection image storage unit 60.

Figure 7:
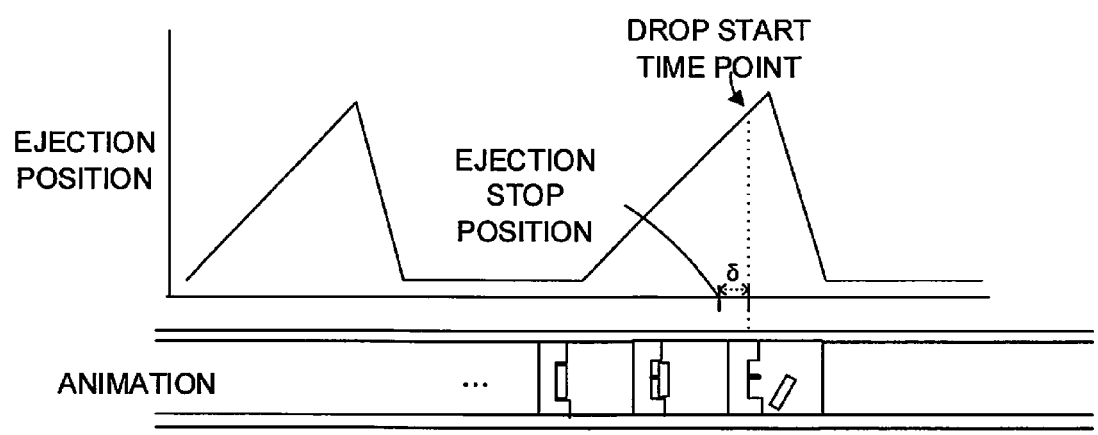
FIG. 7 is a diagram showing the position of the ejector pins and images captured by a camera in that position.

FIG. 7 is a diagram showing the position of the ejector pins 20a and 20b and the images captured by the camera 30 in that position.

As the ejection position of the ejector pins 20a and 20b advances, the molded articles 22a and 22b in the movable mold half 24 are gradually released from the movable mold half 24. When the ejection position of the ejector pins 20a and 20b reaches a predetermined position, the mold release of the molded articles 22a and 22b is completed, whereupon the molded articles 22a and 22b drop. The images captured by the camera 30 and stored in the ejection image storage unit 60 for each predetermined sampling period are analyzed in an ejection stop time point setting unit 48.

In the ejection process, the images captured by the camera 30 change depending on the position of the ejector pins 20a and 20b. When the ejector pins 20a and 20b are not projected, the molded articles 22a and 22b are fitted in the movable mold half 24. As the ejector pins 20a and 20b are projected, thereafter, the molded articles 22a and 22b are gradually ejected from the movable mold half 24. When the ejector pins 20a and 20b then reach a position just short of the ejector advance stroke, the molded articles 22a and 22b drop from the movable mold half 24.

The camera 30 captures the images of the molded article ejection process for each predetermined sampling period. Before the molded articles 22a and 22b drop, therefore, they slowly move substantially in the same direction and at the same speed as they are shot by the camera 30. When the molded articles 22a and 22b reach their dropping position, thereafter, they are ejected and drop from the movable mold half 24, so that the direction and speed of their movement greatly change. The ejection stop time point setting unit 48 detects the changes of the movement direction and speed of the molded articles 22a and 22b stored in the ejection image storage unit 60, thereby locating the dropping position of the molded articles 22a and 22b.

Figure 8A:
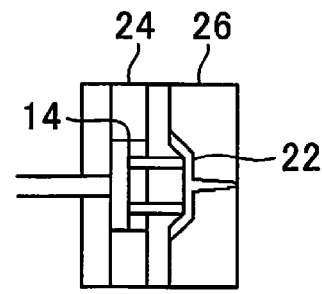
FIGS. 8A to 8E are views showing pickup images of an ejection process captured by the camera.
Figure 8B:
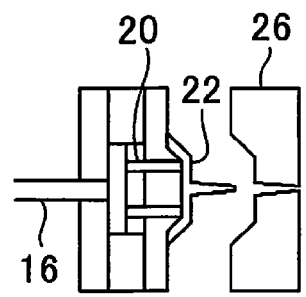
Figure 8C:
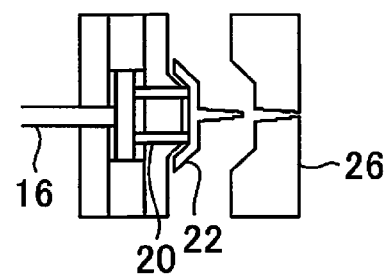
Figure 8D:
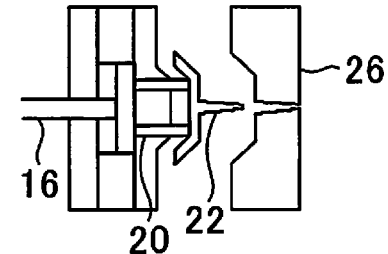
Figure 8E:
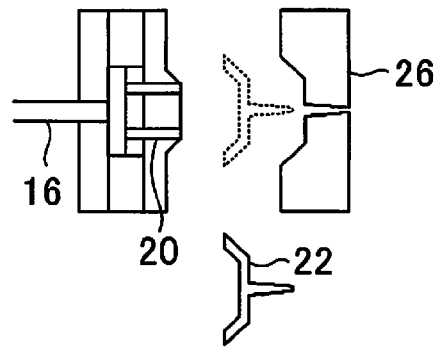

FIGS. 8A to 8E are views showing pickup images of the ejection process captured by the camera 30. FIG. 8A shows a state before the start of the mold opening, and FIG. 8B shows a state at the start of the mold opening. FIG. 8C shows a position in which the mold release of the molded articles 22a and 22b is started after the start of the ejection, and FIG. 8D shows a position reached just before the molded articles 22a and 22b fully released from the mold drop as the ejection is further progressed. FIG. 8E shows a position reached when the mold opening is completed as the ejection is further progressed, and the molded articles 22a and 22b completely drop in this position. As described above with reference to FIG. 7, the movement direction and speed of the molded articles 22a and 22b change when the molded articles 22a and 22b start to drop, whereby the dropping position of the molded articles 22a and 22b can be located.

After the drop start position of the molded articles 22a and 22b is obtained, a position retracted from it by a "predetermined distance" in the retracting direction of an ejection device is set as an ejection stop position. The "predetermined distance" is obtained by first obtaining, by an experiment or the like, a position in which the molded articles 22a and 22b do not drop but can be manually removed and then setting the "predetermined distance" so that the obtained position is the ejection stop position. This predetermined distance can be stored in advance in a nonvolatile memory of the injection molding machine. Alternatively, a plurality of values for the predetermined distance may be stored in advance in the nonvolatile memory, depending on the shapes of the molded articles 22a and 22b, so that one of the stored values fit for the shapes of the molded articles 22a and 22b to be actually formed can be selected.

An ejection stop time may be set in place of the ejection stop position, as ejection stop time point. In setting the ejection stop time, the drop of the molded articles 22a and 22b is determined by the changes of the movement direction and speed of the molded articles 22a and 22b, the time elapsed since the start of the ejection is obtained as a drop start time, and a time that precedes the obtained drop start time by the "predetermined time" is set as the ejection stop time.

The "predetermined time" is calculated by first obtaining, by an experiment or the like, a time elapsed since the start of the ejection during which the molded articles 22a and 22b do not drop but can be manually removed and then setting the "predetermined time" so that the obtained time is the ejection stop time. This predetermined time can be stored in advance in the nonvolatile memory of the injection molding machine. Alternatively, a plurality of values for the predetermined time may be stored in advance in the nonvolatile memory, depending on the shapes of the molded articles 22a and 22b, so that one of the stored values fit for the shapes of the molded articles 22a and 22b to be actually formed can be selected.

Figure 9:
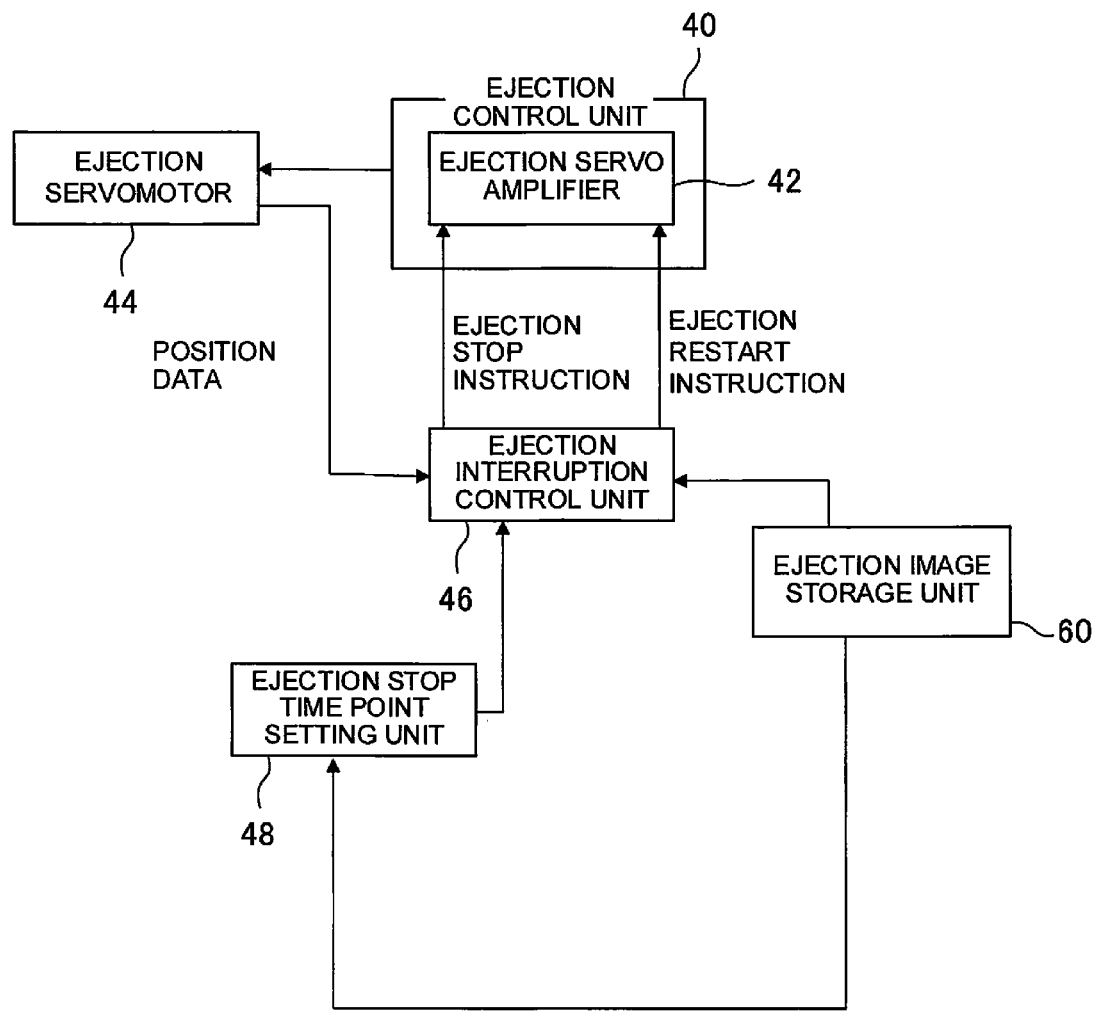
FIG. 9 is a diagram showing a first example of a configuration around an ejection control unit constituting the ejection controller for the injection molding machine according to the present invention.

Referring now to FIG. 9, there will be described a first example of a configuration around an ejection control unit constituting the ejection controller for the injection molding machine according to the present invention.

An ejection control unit 40 comprises an ejection servo amplifier 42 therein and serves to control the positions of the ejector 14 and the ejector pins 20a and 20b. A signal from the ejection servomotor 42 is input to an ejection servomotor 44 and controls the position of the ejector pins 20a and 20b.

An ejection interruption control unit 46 receives position data on the ejector pins 20a and 20b from the ejection servomotor 44 and issues an ejection stop instruction and an ejection restart instruction to the ejection servo amplifier 42 in the ejection control unit 40. Further, the ejection stop time point setting unit 48 delivers the calculated ejection stop time to the ejection interruption control unit 46.

The molded article ejection image storage unit 60 stores the images captured by the camera 30 (image pickup means) for each sampling period and delivers the stored images to the ejection interruption control unit 46 and the ejection stop time point setting unit 48.

In the ejection stop time point setting unit 48, the drop start position of the molded articles 22a and 22b is obtained based on the images stored in the molded article ejection image storage unit 60, and the ejection stop position is set by subtracting the predetermined distance from the obtained drop start position. Alternatively, the drop start time of the molded articles 22a and 22b is obtained based on the images stored in the ejection image storage unit 60, and the ejection stop time is set by subtracting the predetermined time from the obtained drop start time. The ejection stop position or time set in this manner is delivered to the ejection interruption control unit 46.

The ejection interruption control unit 46 compares the position data delivered from the ejection servomotor 44 or data from timing means (not shown) with the ejection stop position or ejection stop time, and the ejection stop instruction and the ejection restart instruction are issued to the ejection servo amplifier 42.

Figure 10:
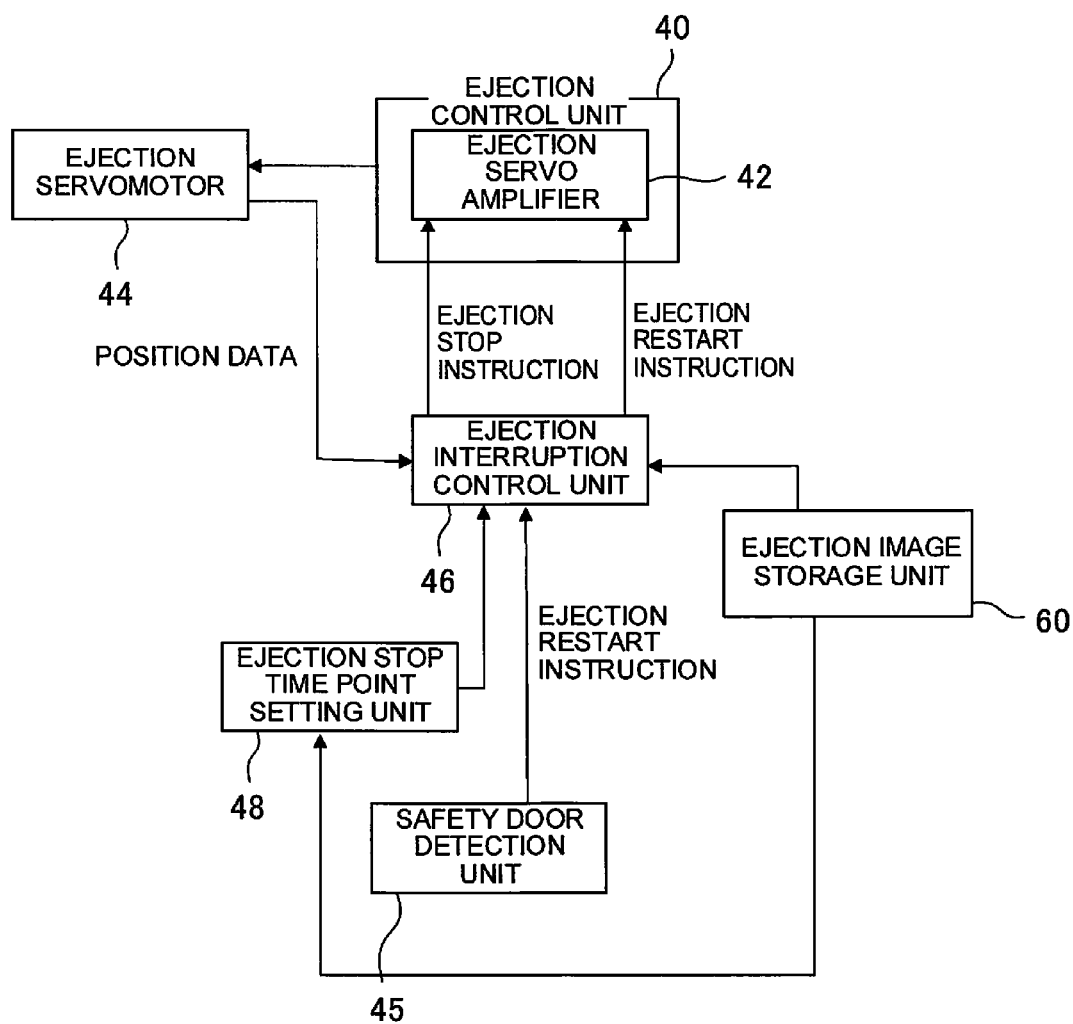
FIG. 10 is a diagram showing a second example of the configuration around the ejection control unit constituting the ejection controller for the injection molding machine according to the present invention.

Referring now to FIG. 10, there will be described a second example of the configuration around the ejection control unit constituting the ejection controller for the injection molding machine according to the present invention.

In this example, a safety door detection unit 45 is provided for detecting closing of the safety door 10. On detecting the closing of the safety door 10, the safety door detection unit 45 outputs an ejection restart signal to the ejection interruption control unit 46. Since other configurations are the same as those of the first example shown in FIG. 9, a description thereof will be omitted.

In this second example, the ejection device is configured so that it cannot restart the ejection unless the safety door 10 is closed, so that an operator's safety can be improved.

Figure 11:
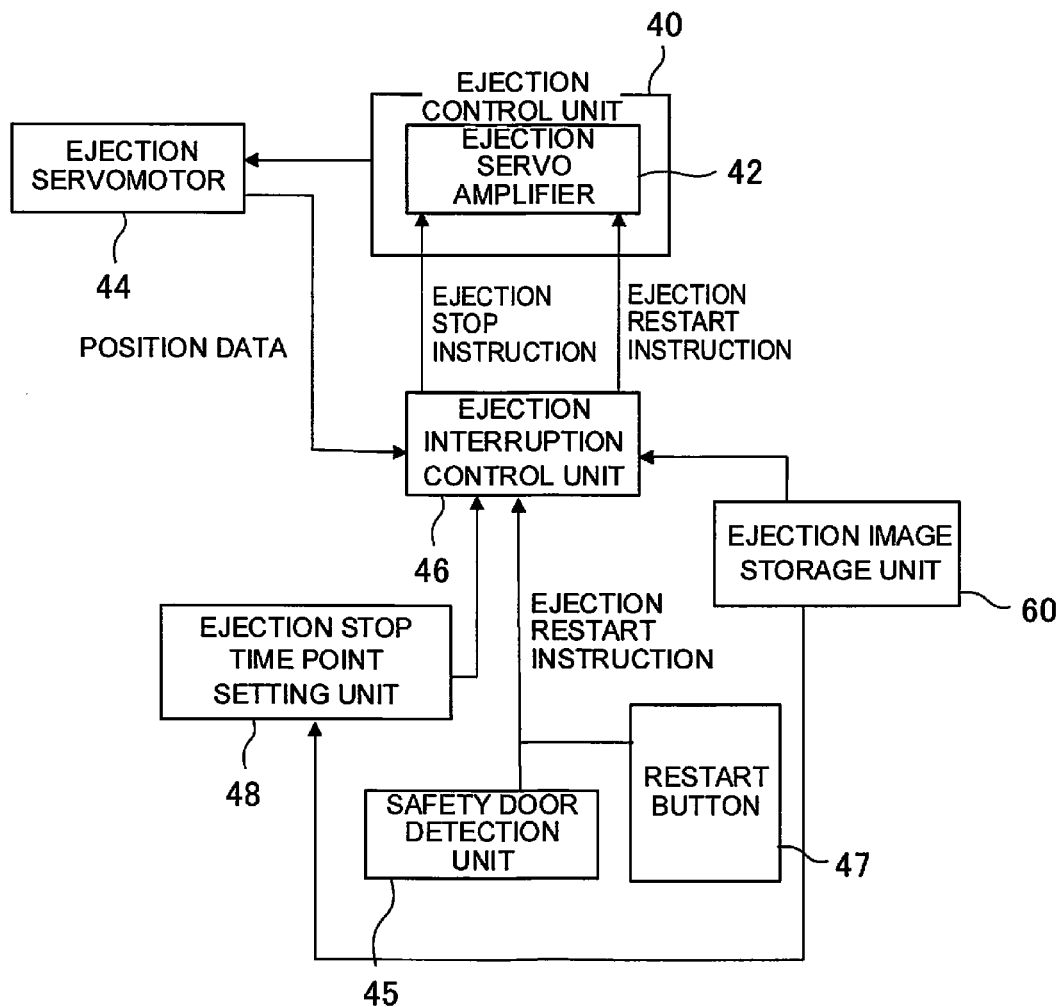
FIG. 11 is a diagram showing a third example of the configuration around the ejection control unit constituting the ejection controller for the injection molding machine according to the present invention.

Referring now to FIG. 11, there will be described a third example of the configuration around the ejection control unit constituting the ejection controller for the injection molding machine according to the present invention.

In this example, a restart button 47 is provided in addition to the safety door detection unit 45 for detecting the closing of the safety door 10. When the safety door detection unit 45 detects the closing of the safety door 10 and the restart button 47 is depressed thereafter, the ejection restart signal is output to the ejection interruption control unit 46. Since other configurations are the same as those of the first example shown in FIG. 9, a description thereof will be omitted.

Thus, the operator can restart the ejection by the ejection device by confirming safe conditions and depressing the restart button 47 to give an instruction after the safety door 10 is closed. Thus, the ejection by the ejection device can be restarted more safely. The restart button 47 may be replaced with some other restart instruction means.

Figure 12:
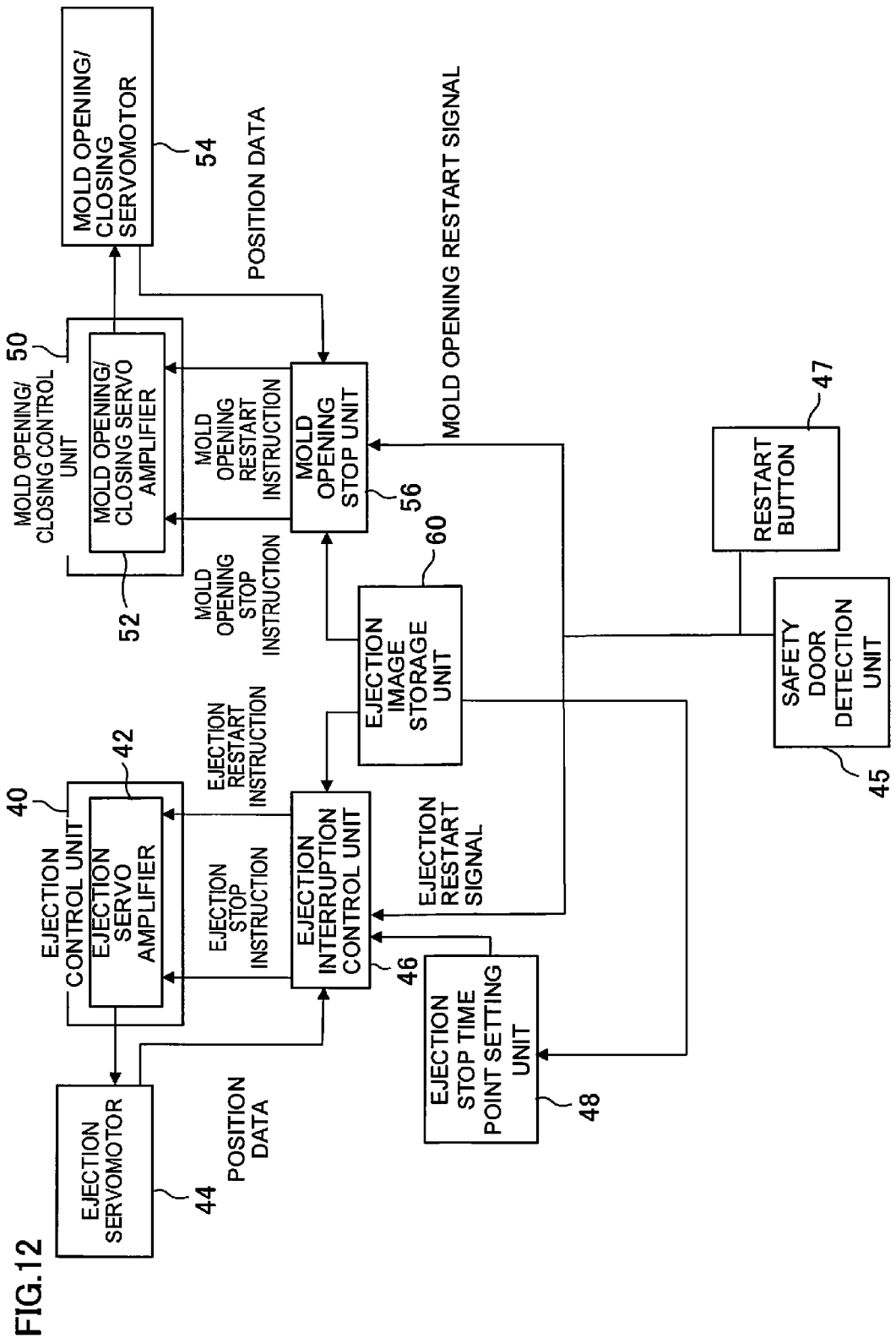
FIG. 12 is a diagram showing a fourth example of the configuration around the ejection control unit constituting the ejection controller for the injection molding machine according to the present invention.

Referring now to FIG. 12, there will be described a fourth example of the configuration around the ejection control unit constituting the ejection controller for the injection molding machine according to the present invention.

The ejection may sometimes be started during mold opening in a mold opening process of the injection molding machine. In such a case, a mold opening operation and an ejection operation are performed simultaneously in parallel, so that the mold may sometimes be opened when the ejection is interrupted.

Thus, in this example, if the mold is opened when the ejection is interrupted in consideration of safety, the mold opening, along with the ejection, is interrupted. When the safety door is closed after the molded articles are manually removed, both the mold opening and the ejection are restarted. Alternatively, both the mold opening and the ejection are restarted when the safety door is closed and the restart button is depressed to give an instruction.

A mold opening/closing control unit 50 comprises therein a mold opening/closing servo amplifier 52 for driving a mold opening/closing servomotor 54. A mold opening stop unit 56 receives mold opening position data from the mold opening/closing servomotor 54, further receives the images stored in the molded article ejection image storage unit 60, and issues a mold opening stop instruction and a mold opening restart instruction to the mold opening/closing servo amplifier 52.

In this example, therefore, the mold opening operation is also stopped as the ejection by the ejection device is interrupted, and the closing of the safety door 10 is then detected by the safety door detection unit 45. When the restart button 47 is depressed, thereafter, the ejection restart signal is output to the ejection interruption control unit 46 and the mold opening stop unit 56, whereupon the ejection operation and the mold opening operation are restarted.

Thus, the mold opening operation is also stopped as the ejection by the ejection device is interrupted, and the mold opening and the ejection by the ejection device are restarted at the same time. This facilitates the removal of the molded articles when the ejection by the ejection device is stopped. The restart button 47 may be replaced with some other instruction means that gives instructions to restart the ejection and the mold opening. Further, the ejection and the mold opening may be restarted only on detection of the closing of the safety door 10 without any special instructions for the restart.

In the examples shown in FIGS. 9 to 12, moreover, an enable/disable switch for ejection interruption may be provided such that the operator can previously disable ejection interruption during continuous molding, for example, and if necessary, enable the ejection interruption to manually remove the molded articles and check them for condition.

The invention claimed is:

1. An ejection controller for an injection molding machine, wherein the injection molding machine comprises an injection unit, a mold, and an ejection device for releasing a molded article of a resin, which is injected from the injection unit into the mold, from the mold after the resin is molded, and the ejection controller comprises:
an image pickup unit configured to capture an image of an ejection process for the molded article based on an ejection operation of the ejection device;
a molded article ejection image storage unit configured to store the image of the molded article ejection process captured by the image pickup unit
an ejection stop time point setting unit configured to analyze the image stored in the molded article ejection image storage unit to obtain, as a drop start time point, a point in time when the molded article starts to drop from the mold and set an ejection stop time point based on the obtained drop start time point and
an ejection interruption control unit configured to interrupt the ejection operation of the ejection device at the ejection stop time point set by the ejection stop time point setting unit, wherein
the ejection stop time point setting unit obtains, as a drop start position, a position of the ejection device in which the molded article starts to drop from the mold, sets the obtained drop start position as the drop start time point, obtains, as an ejection stop position, a position retracted from the obtained drop start position by a predetermined distance in a retracting direction of the ejection device, and sets the obtained ejection stop position as the ejection stop time point, and the ejection interruption control unit stops the ejection by the ejection device at the obtained ejection stop position.

2. The ejection controller for an injection molding machine according to claim 1, wherein the ejection stop time point setting unit obtains, as a drop start time, an elapsed time since the start of the ejection during which the molded article starts to drop from the mold, sets the obtained drop start time as the drop start time point, obtains, as an ejection stop time, a time preceding the obtained drop start time by a predetermined time, and sets the obtained ejection stop time as the ejection stop time point, and the ejection interruption control unit stops the ejection by the ejection device when the elapsed time since the start of the ejection reaches the ejection stop time.

3. An ejection control method for an injection molding machine, wherein the injection molding machine is configured to control an ejection device for releasing a molded article of a resin, which is injected from an injection unit into a mold, from the mold after the resin is molded, and the ejection control method comprises:
capturing an image of an ejection process for the molded article based on an ejection operation of the ejection device;
storing the captured image of the molded article ejection process;
analyzing the stored image to obtain, as a drop start time point, a point in time when the molded article starts to drop from the mold and setting an ejection stop time point based on the obtained drop start time point;
interrupting the ejection operation of the ejection device at the set ejection stop time point;
analyzing the stored image and obtaining, as a drop start position for the drop start time point, a position of the ejection device at which the molded article starts to drop from the mold;
obtaining, as an ejection stop position for the ejection stop time point, a position retracted from the drop start position by a predetermined distance in a retracting direction of the ejection device; and
stopping the ejection by the ejection device at the obtained ejection stop position.

4. The ejection control method for an injection molding machine according to claim 3, further comprising:
analyzing the stored image and obtaining, as a drop start time for the drop start time point, an elapsed time since the start of the ejection when the molded article starts to drop from the mold;
obtaining, as an ejection stop time for the ejection stop time point, a time preceding the drop start time by a predetermined time; and
stopping the ejection by the ejection device when the elapsed time since the start of the ejection reaches the ejection stop time.

* * * * *